(12) United States Patent
Lattin

(10) Patent No.: US 7,462,105 B2
(45) Date of Patent: Dec. 9, 2008

(54) FLEXIBLE DRIVE INTERFACE

(75) Inventor: Robert M. Lattin, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 258 days.

(21) Appl. No.: 10/898,820

(22) Filed: Jul. 26, 2004

(65) Prior Publication Data

US 2006/0019756 A1  Jan. 26, 2006

(51) Int. Cl.
*F16D 3/28* (2006.01)

(52) U.S. Cl. .................... 464/71; 464/72; 464/137; 464/138

(58) Field of Classification Search .......... 464/71, 464/72, 137, 138
See application file for complete search history.

(56) References Cited

U.S. PATENT DOCUMENTS

| | | | | | |
|---|---|---|---|---|---|
| 1,760,492 | A | * | 5/1930 | Hall | 464/71 |
| 2,477,447 | A | * | 7/1949 | Fawick | 464/72 |
| 3,434,303 | A | * | 3/1969 | Leyer | 464/71 |
| 3,461,771 | A | * | 8/1969 | Briles | 411/34 |
| 3,791,169 | A | * | 2/1974 | Wright | 464/71 |
| 3,813,898 | A | * | 6/1974 | Hatch | 464/71 |
| 5,163,796 | A | * | 11/1992 | Belser | |

OTHER PUBLICATIONS

"Thermo King Corporation Service Parts Manual SL-300" printed Jun. 19, 2002.

* cited by examiner

*Primary Examiner*—Victor MacArthur
(74) *Attorney, Agent, or Firm*—Michael Best & Friedrich LLP

(57) ABSTRACT

A coupling including a first plate having an aperture therethrough and a resilient bushing at least partially disposed within the aperture. An inner liner has a cylindrical bore therethrough. The inner liner is positioned at least partially within the resilient bushing. A second plate includes a drive pin. The drive pin is at least partially disposed within the cylindrical bore to couple the first plate and the second plate for rotation.

9 Claims, 3 Drawing Sheets

FLEXIBLE DRIVE INTERFACE

BACKGROUND

The present invention relates generally to a drive interface between a driving element and a driven element. More particularly, the present invention relates to a flexible drive interface between a driving element and a driven element.

Drive interfaces, such as couplings, are often used to connect two rotating shafts to one another. In some situations, it is possible to align the two shafts to a sufficient degree to enable the use of a solid coupling. However, in many situations this alignment is difficult to achieve or maintain. Flexible couplings are often employed in these situations to allow the two shafts to be coupled without the degree of alignment required with a solid coupling.

Flexible couplings generally include an element that provides some flexibility or tolerance to misalignment. However, these components are subject to relatively high cyclic stress and can wear out quickly. The relatively high rate of wear requires additional maintenance or inspection to assure the satisfactory operation of the equipment.

SUMMARY

The present invention provides a coupling including a first plate having an aperture therethrough and a resilient bushing at least partially disposed within the aperture. An inner liner has a cylindrical bore therethrough. The inner liner is positioned at least partially within the resilient bushing. A second plate includes a drive pin. The drive pin is at least partially disposed within the cylindrical bore to couple the first plate and the second plate for rotation.

In another aspect, the invention provides a coupling between a driving element and a driven element. The coupling includes a first disc coupled to one of the drive element and the driven element and rotatable about a rotational axis. The first disc includes a first quantity of apertures. Each of the apertures can be spaced a substantially equal radial distance from the rotational axis. A second disc is coupled to the other of the drive element and the driven element and is rotatable about the rotational axis. The invention also includes a second quantity of pins. Each of the pins can be spaced a substantially equal radial distance from the rotational axis. The invention further includes a third quantity of resilient bushings. Each of the bushings is at least partially disposed in one of the apertures. The invention also includes a fourth quantity of inner liners. Each of the inner liners is at least partially disposed within one of the resilient bushings. Each one of the pins is engageable with one of the inner liners to couple the first disc and the second disc for rotation.

In still another aspect, the present invention provides a method of coupling a drive element to a driven element. The method includes connecting a first disc to one of the drive element and the driven element such that the first disc is rotatable about a drive axis. The first disc includes at least one pin that extends substantially parallel to the drive axis. The method also includes connecting a second disc to the other of the drive element and the driven element such that the second disc is rotatable about a drive axis. The second disc includes at least one aperture that extends substantially parallel to the drive axis. The method further includes bonding an inner liner to a resilient bushing, inserting the bushing in the aperture, and inserting the pin in the inner liner such that the first disc and the second disc are rotatably coupled to one another.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings.

DETAILED DESCRIPTION

Figure 1:
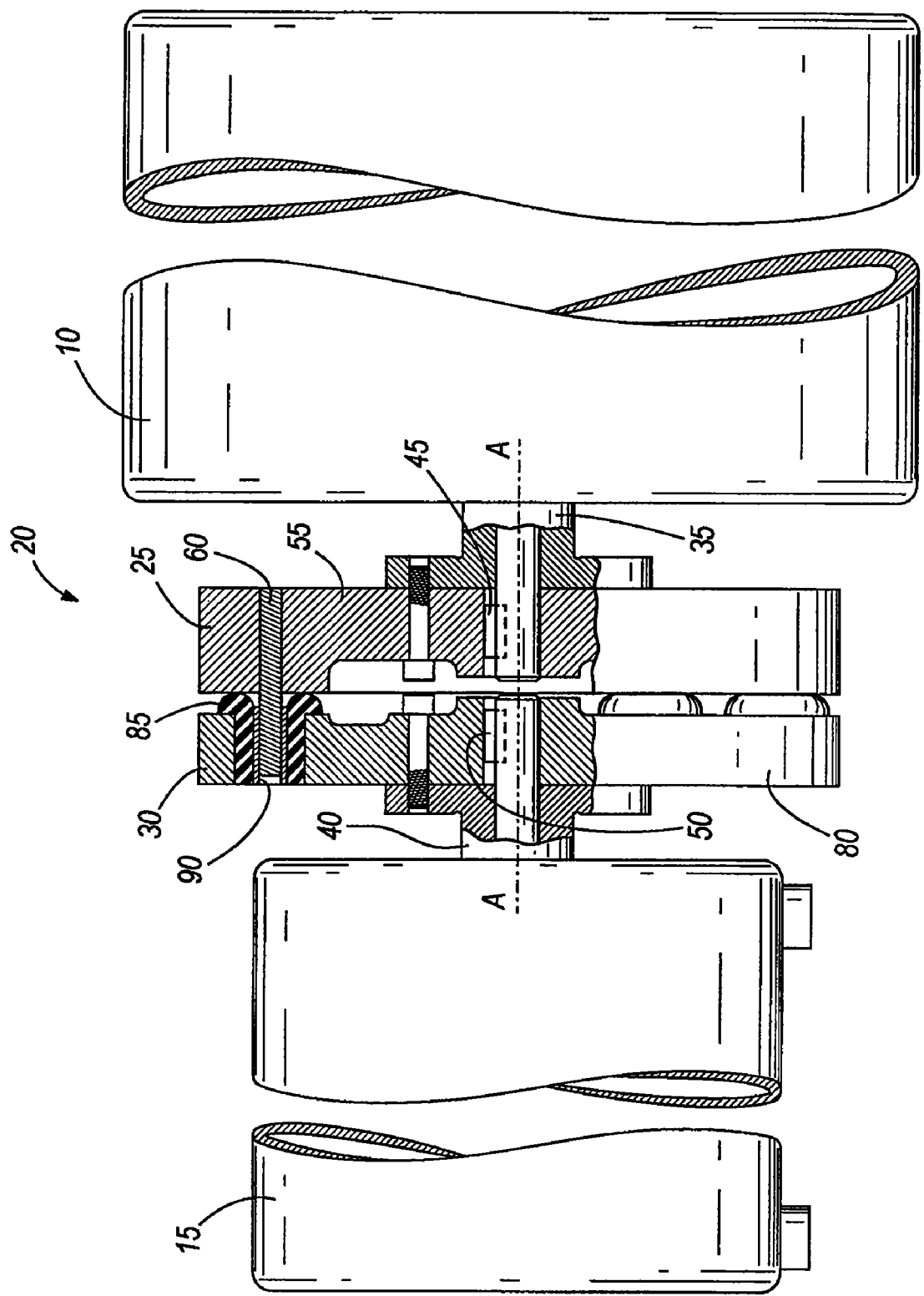
FIG. 1 is a partial section view of a coupling between a drive member and a driven member.
Figure 2:
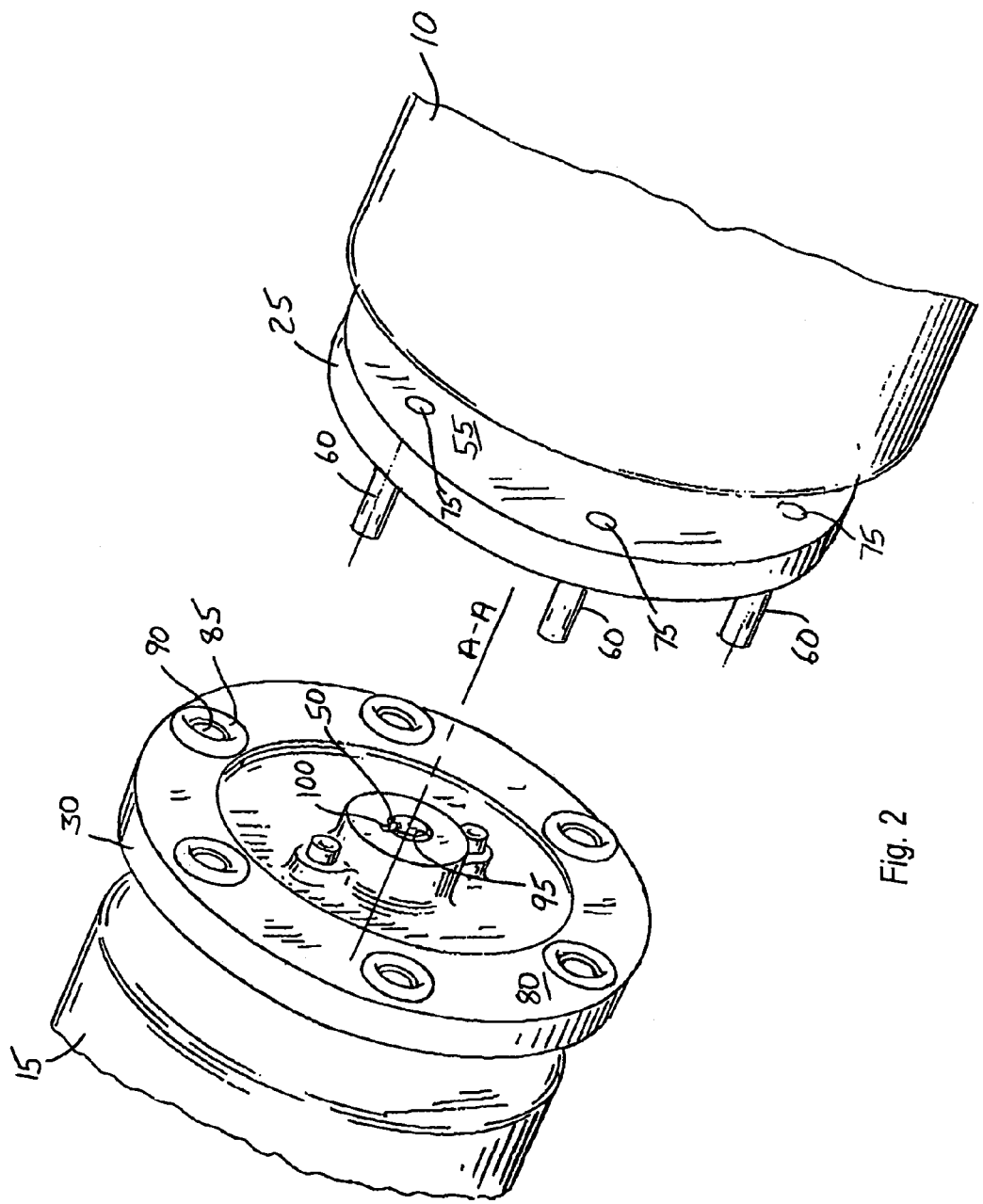
FIG. 2 is a perspective view of the coupling of FIG. 1 in a disengaged state.

FIG. 1 illustrates a drive element 10, a driven element 15, and a coupling 20 connecting the drive element 10 and the driven element 15 for rotation. Many different devices can be used as drive elements 10 including, but not limited to, electric motors and combustion engines (e.g., internal combustion engines, diesel engines, combustion turbine engines, and the like). In addition, many different devices can be used as driven elements 15 including, but not limited to, pumps and compressors.

The coupling 20 includes a male half 25 and a female half 30. As illustrated in FIG. 1, the male half 25 is coupled to an output shaft 35 of the drive element 10 and the female half 30 is coupled to an input shaft 40 of the driven element 15. A key 45 engages the male half 25 and the output shaft 35 to allow some axial movement of the male half 25, while fixedly coupling the shaft 35 and the male half 25 for rotation. Similarly, the female half 30 and the input shaft 40 each engage a key 50 that fixedly couples the components for rotation, while allowing for some axial movement. It should be noted that the illustrated construction shows the male half 25 connected to the drive element 10 and the female half 30 connected to the driven element 15. However, in other constructions this arrangement may be reversed.

The male half 25 of the coupling 20 includes a plate or disc 55 and a plurality of drive pins 60. The disc 55 is substantially cylindrical and includes a central bore 65 sized to receive the output shaft 35. A keyway 70 formed adjacent the central bore 65 receives the key 45 and couples the disc 55 and the shaft 35 for rotation. As such, the disc 55 rotates about a drive or rotational axis A-A that extends along the long axis of the shaft 35.

The pins 60 are each positioned a substantially equal radial distance from the drive axis A-A and are oriented such that the long axis of the pins 60 is substantially parallel to the drive axis A-A. The disc 55 includes a plurality of bores 75 that receive the pins 60 and are sized to define an interference fit between the pins 60 and the disc 55. This arrangement allows for easy assembly, while still providing a solid and accurate connection between the pins 60 and the disc 55. The pins 60 can simply be driven into the bores 75, with no special assembly techniques required.

Figure 3:
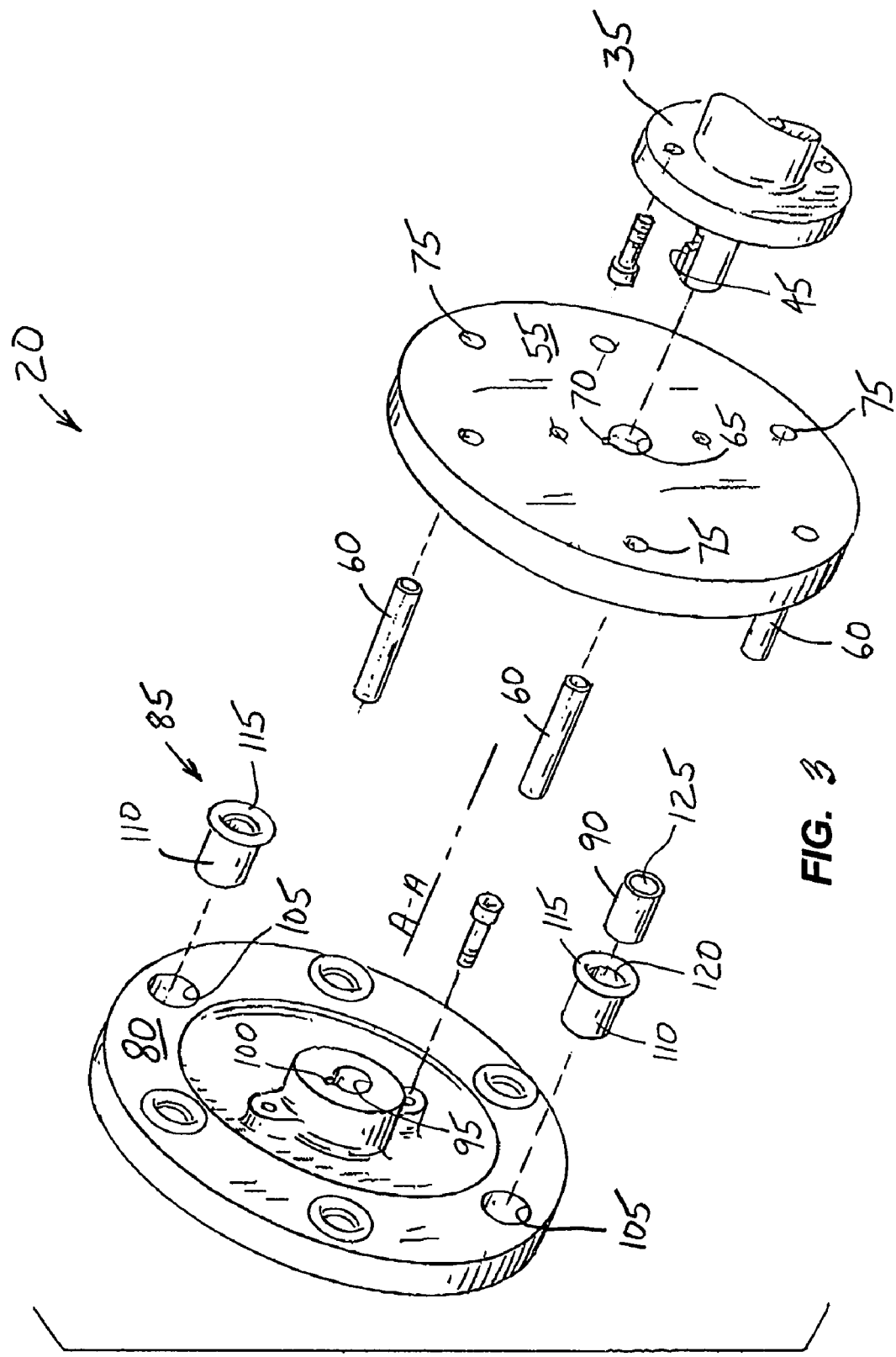
FIG. 3 is an exploded view of the coupling of FIG. 1.

As shown in FIG. 3, six pins 60 are used. Of course, other constructions may use more or fewer pins 60. In other constructions, threaded pins may be used. However, threaded pins require that the holes and pins be accurately threaded to assure that the pins remain substantially parallel to one another and to the drive axis A-A. In still other constructions, the pins 60 are arranged at two or more different radial distances from the drive axis A-A. This arrangement allows for the use of more pins 60, which in turn allows the coupling 20 to transmit additional torque.

The female half 30 of the coupling 20 includes a second plate or disc 80, a plurality of resilient bushings 85, and a plurality of inner liners 90. The disc 80 includes a bore 95 through the disc center that is sized to receive the input shaft 40. A keyway 100 formed adjacent the bore 95 is sized to receive the key 50 to connect the disc 80 and the shaft 40 for rotation. Thus, the disc 80 rotates around the center of the shaft 40, which is substantially coincident with the drive axis A-A. A plurality of apertures 105 are spaced a substantially equal radial distance from the drive axis A-A and pass through the disc 80 in a direction that is substantially parallel to the drive axis A-A. Generally, the number of apertures 105 equals the number of drive pins 60 present in the male half 25 of the coupling 20. However, some constructions may include more apertures 105 than the number of drive pins 60 present in the male half 25. In addition, the distance that the apertures 105 are spaced from the drive axis A-A is substantially equal to the distance that the pins 60 are spaced from the drive axis A-A. In constructions in which drive pins 60 are spaced varying distances from the drive axis A-A, the apertures 105 in the female half 30 of the coupling 20 are also spaced varying distances from the drive axis A-A. Thus, one aperture 105 aligns with each drive pin 60 when the coupling 20 is assembled.

The resilient bushings 85 are positioned such that each one of the resilient bushings 85 is at least partially disposed within one of the plurality of apertures 105. Generally, the resilient bushings 85 are formed from a resilient elastomer such as rubber. Of course, other resilient materials (e.g., plastic, soft metal, composites, and the like) may also be used to form the resilient bushings 85.

Each bushing 85 includes a long substantially cylindrical portion 110, a collar portion 115, and a bore 120. The cylindrical portion 110 is sized to fit snugly within the apertures 105, with the collar portion 115 acting as a stop. The collar portion 115 contacts the surface of the second disc 80 to inhibit further insertion of the bushing 85 into the aperture 105. As shown in FIG. 1, the collar portion 115 is disposed between the first disc 55 and the second disc 80 when the coupling 20 is assembled. During operation of the coupling 20, vibration or other conditions may cause movement of the bushings 85. The collar 115 inhibits movement in one direction and the position of the first disc 55 relative to the second disc 80 inhibits movement in the opposite direction. Thus, the bushings 85 are trapped within the apertures 105 when the coupling 20 is assembled.

The bore 120 of each bushing 85 is sized and shaped to receive one of the plurality of inner liners 90. The inner liners 90, illustrated in FIG. 3 are substantially cylindrical components having a central bore or aperture 125. In some constructions, the inner liners 90 include a step feature on the outer surface or a feature similar to the collar 115 of the bushing 85. The step feature functions much like the collar 115 of the bushings 85 to inhibit movement of the inner liner 90 when the liner 90 is positioned within the bushing 85. If a step or change in diameter is employed, a corresponding step or change in diameter is formed in the bore of the resilient bushing 85 to receive the inner liner 90. Constructions that employ an inner liner having a collar may also include a bushing that includes a region sized to receive the collar.

The inner liners 90 are formed from a composite material that is harder than the resilient bushings 85. The hard inner liner 90 provides wear resistance for the bushing 85 that increases the useful life of the bushings 85. Of course, other constructions may use other materials such as metals, plastics, ceramics, and the like to form the inner liners 90. No matter the material used, it is preferable that the liner 90 be harder than the resilient bushing 85.

Each of the inner liner bores 125 is sized to receive one of the drive pins 60. Generally, a close fit between the bore 125 and the drive pin 60 is desirable. However, loose fits may also be employed if desired.

In other constructions, the inner liner and bushing are formed as a single component. For example, a hard composite layer may be formed directly onto, and bonded with, a resilient rubber material. In another construction, a hard plastic or soft metal is molded or cast into the resilient material to permanently bond the hard inner material to the resilient bushing material.

To assemble the coupling 20, the drive pins 60 are inserted into the first disc 55. Generally, the pins 60 are press fit into place to achieve the desired alignment and fit between the first disc 55 and the drive pins 60. To assemble the female half, the inner liners 90 are bonded to the interior of the bushings 85. Generally, an adhesive is used to bond the inner liner 90 and the bushing 85. However, other constructions may employ a thermal process in which one or both of the components are partially melted to achieve a bond. In still other constructions, mechanical devices such as lances, projections, burrs, barbs, and the like are formed on one or both of the inner liner 90 and the bushing 85 at their respective interface surfaces. The mechanical devices engage the corresponding component (i.e., mechanical devices formed on the inner liner 90 engage the bushing 85 and visa versa) to bond the two components 85, 90. The bushing and inner liner assemblies are then inserted into the apertures 105 of the second disc 80.

With the two assembled halves 25, 30 of the coupling 20 attached to the respective input shaft 40 and output shaft 35, the input shaft 40 and output shaft 35 are aligned and spaced axially apart a distance that allows each drive pin 60 to be inserted into the bore 125 of one of the inner liners 90. The drive pins 60 are slidably engaged within the bores 125 of the inner liners 90 to couple the first disc 55 to the second disc 80. The drive pins 60 are also movable in an axial direction relative to the inner liners 90 to allow relative axial movement between the first disc 55 and the second disc 80 during operation of the coupling 20. As illustrated in FIG. 1, the axial movement of the drive pins 60 during operation of the coupling 20 is facilitated by the drive pins 60 being coupled to the second disc 80 within the bores 125 without fastening the drive pins 60 to the second disc 80 using a fastener (e.g., a nut, etc.). Each end of the drive pins 60 that is coupled to the respective inner liner 90 is terminated within the associated bore 125 such that the ends of the drive pins 60 are disposed within the bores 125 and do not extend completely through the second disc 80. With the pins 60 engaged with the inner liners 90, rotation of the output shaft 35 produces a corresponding rotation of the input shaft 40.

The resilient bushings 85 are flexible enough to deform to accept drive pins 60 that are slightly misaligned, such as would occur when the output shaft 35 and the input shaft 40 are not perfectly aligned. In addition, the resilient bushings 85 are able to absorb impacts that may occur during a sudden start or sudden stop of the drive element 10 or an impact produced when a sudden load change on the driven element 15 occurs (e.g., a sudden increase in pump backpressure). The inner liners 90 provide wear resistance that protects the resilient bushings 85 from degradation that would inevitably occur if the resilient bushings 85 were in direct contact with the drive pins 60.

Although the invention has been described in detail with reference to certain preferred embodiments, variations and modifications exist within the scope and spirit of the invention as described and defined in the following claims.

What is claimed is:

1. A coupling between a driving element and a driven element, the coupling comprising:
   a first disc coupled to one of the drive element and the driven element and rotatable about a rotational axis, the first disc including a first quantity of apertures;
   a second disc coupled to the other of the drive element and the driven element and rotatable about the rotational axis, the second disc including bores;
   a second quantity of pins received by the bores, the bores sized to define an interference fit between the pins and the second disc;
   a third quantity of resilient bushings, each of the bushings at least partially disposed in one of the apertures and directly snug fit into the associated aperture without a rigid outer collar, each of the resilient bushings including a retaining lip positioned between the first disc and the second disc, the retaining lip directly engaged by the first disc and the second disc; and
   a fourth quantity of inner liners, each of the inner liners at least partially disposed within one of the resilient bushings, each of the inner liners including a cylindrical bore and formed from a composite material that is harder than the resilient bushings to inhibit wear of the resilient bushings, each one of the pins engageable with one of the inner liners to couple the first disc and the second disc for rotation, each of the pins including an end terminating within one of the cylindrical bores without extending completely through the first disc, the pins movable in both axial directions relative to the inner during operation of the coupling without axial compression of the resilient bushings.

2. The coupling of claim 1, wherein the first quantity, the second quantity, the third quantity, and the fourth quantity are substantially equal.

3. The coupling of claim 1, wherein the resilient bushings each include a flexible elastomer material.

4. The coupling of claim 1, wherein the resilient bushings each include a rubber material.

5. The coupling of claim 1, wherein the inner liners are bonded to the resilient bushings.

6. The coupling of claim 1, wherein each of the apertures is spaced a first radial distance from the rotational axis and each of the pins is spaced a second radial distance from the rotational axis, the first radial distance being substantially equal to the second radial distance.

7. The coupling of claim 1, wherein the pins are coupled to the first disc without the pins being coupled to the first disc by a fastener attached to respective ends of the pins.

8. The coupling of claim 1, wherein the retaining lips are in communication with the first disc to inhibit movement of the resilient bushings in a first direction.

9. The coupling of claim 8, wherein the second disc is in communication with the retaining lips to inhibit movement of the resilient bushings in a second direction.

\* \* \* \* \*

UNITED STATES PATENT AND TRADEMARK OFFICE
CERTIFICATE OF CORRECTION

PATENT NO.         : 7,462,105 B2                                        Page 1 of 1
APPLICATION NO.    : 10/898820
DATED              : December 9, 2008
INVENTOR(S)        : Robert M. Lattin It is certified that error appears in the above-identified patent and that said Letters Patent is hereby corrected as shown below:

In Claim 1, line 9:

change "movable in both axial directions relative to the inner during operation..." to
-- movable in both axial directions relative to the inner lining during operation... --

Signed and Sealed this

Fifth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,462,105 B2  
APPLICATION NO. : 10/898820  
DATED : December 9, 2008  
INVENTOR(S) : Robert M. Lattin Page 1 of 1

It is certified that error appears in the above-identified patent and that said Letters Patent is hereby corrected as shown below:

Column 6, In Claim 1, lines 9 and 10:

change "movable in both axial directions relative to the inner during operation..." to
-- movable in both axial directions relative to the inner lining during operation... --

This certificate supersedes the Certificate of Correction issued May 5, 2009.

Signed and Sealed this

Twenty-sixth Day of May, 2009

JOHN DOLL  
*Acting Director of the United States Patent and Trademark Office*